(12) United States Patent
Koide

(10) Patent No.: US 6,623,218 B1
(45) Date of Patent: Sep. 23, 2003

(54) CUTTING TOOL AND HOLDER-CARRYING TOOL

(75) Inventor: Minoru Koide, Gifu (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/536,627

(22) Filed: Mar. 28, 2000

(30) Foreign Application Priority Data

Mar. 29, 1999 (JP) .............................. 11-087055

(51) Int. Cl.[7] .............................. B23B 27/14; B23P 15/28
(52) U.S. Cl. .................... 407/119; 407/113; 407/114; 407/116
(58) Field of Search ................. 407/113, 114, 407/115, 116, 119

(56) References Cited

U.S. PATENT DOCUMENTS

| | | | | |
|---|---|---|---|---|
| 5,141,367 A | * | 8/1992 | Beeghly et al. | 407/119 |
| 5,246,315 A | * | 9/1993 | Hansson et al. | 407/114 |
| 5,593,255 A | * | 1/1997 | Satran et al. | 407/113 |
| 5,634,745 A | | 6/1997 | Wiman et al. | |
| 5,707,185 A | * | 1/1998 | Mizutani | 407/42 |
| 5,712,030 A | * | 1/1998 | Goto et al. | 407/119 X |
| 5,975,812 A | * | 11/1999 | Friedman | 407/113 X |
| 6,017,172 A | * | 1/2000 | Ukegawa et al. | 407/113 |
| 6,065,377 A | | 5/2000 | Harada et al. | |
| 6,074,137 A | * | 6/2000 | Betman et al. | 407/103 |

FOREIGN PATENT DOCUMENTS

| | | |
|---|---|---|
| DE | 2 162 682 A | 7/1973 |
| EP | 0 054 481 A | 6/1982 |
| JP | 5-53804 | 7/1993 |
| JP | 11-188501 | 7/1999 |

* cited by examiner

Primary Examiner—Henry W. H. Tsai
(74) Attorney, Agent, or Firm—Sughrue Mion, PLLC

(57) ABSTRACT

A cutting tool and a holder-carrying tool which are capable of lowering the roughness of a surface to be finished (smoothing a surface), during a cutting process are disclosed. A cutting tool is provided on a side portion (on the side of a flank) thereof with a flat drag, which is adapted to remove the ridges and valleys of a surface to be finished, extending between: a terminal end section at which a curved surface of a nose portion terminates; and a flank. Namely, on the inner side of a tangent at the terminal end section of the curved surface of the nose portion, the flat drag is provided in the range of a flat drag angle of $0<\theta<5°$. A width (w) (viewed from the side of a rake face) of this flat drag is in the range of $0<w\leq1.5$ mm.

7 Claims, 5 Drawing Sheets

CUTTING TOOL AND HOLDER-CARRYING TOOL

BACKGROUND OF THE INVENTION

1. Field of the Invention

The present invention relates to a cutting tool having a flat drag portion and to a holder-carrying tool for carrying a holder to which a cutting tool is fixed.

2. Description of the Related Art

In a cutting process according to the related art, ridges and valleys (ridges and valleys representative of a roughness of a processed surface) of a surface to be finished, which are called feed marks, are formed in some cases on and in a surface of a material to be cut, as shown in FIG. 6(a), due to interaction between radiused nose R of a corner part (nose portion) of a cutting tool and the feeding of the material.

Therefore, in order to lower the roughness of the surface to be finished, by removing the feed marks (smooth the surface), a cutting tool provided with a widthwise cutting edge (flat drag edge) parallel to the surface to be finished is used mainly in a face milling process as shown in FIG. 6(b).

The above-mentioned cutting tool for smoothing the surface is formed of, for example, a ceramic tool. Since the tenacity of a ceramic tool is low as compared with that of a cermet tool or a carbide tool, a negative tip in which a rake face and a flank form a right angle is generally used.

When the negative tip is fixed to a front end of a holder, a rake angle (a front rake angle formed by inclining the front end portion of the holder, and a lateral rake angle formed by inclining a lateral portion of the holder) is provided on the holder so as to obtain sharpness of an edge by inclining the negative tip as shown in FIG. 7(a).

However, in this case, the flat drag forms a negative angle with respect to a surface to be finished as shown in FIG. 7(b), i.e., the flat drag is disposed in a sharp projecting state with respect to the surface to be finished. Therefore, the roughness of the surface to be finished cannot be lowered, so that a desired dimensional accuracy cannot be obtained.

Namely, though the flat drag is provided, the feed marks cannot be removed sufficiently.

SUMMARY OF THE INVENTION

The present invention addresses these problems, and aims at providing a cutting tool and a holder-carrying tool which are capable of lowering the roughness of a surface to be finished (smoothing the surface), during a cutting process.

According to an aspect of the present invention, a cutting tool is provided which has a flat drag between a curved portion of a nose portion of the tool and a flank, wherein the flat drag is provided on the inner side of a tangent at a terminal end section of the curved portion of the nose portion.

Preferably, a flat drag angle θ formed by the tangent at the terminal end section of the curved portion of the nose portion with the flat drag is set to a level in excess of 0°.

According to the invention, the flat drag is not formed in such a manner as in the cutting tool of related art, i.e., it is not formed in the direction of a tangent at a terminal end section of a nose portion but provided so that the flat drag is on the inner side of the tangent thereof as illustrated in FIG. 1. Therefore, when the cutting tool is fixed to a holder, the flat drag becomes substantially parallel to the surface to be finished of a material to be cut, even when a front rake angle or a lateral rake angle are provided on a fixing surface (to which the cutting tool is to be fixed) of the holder. Accordingly, even when a cutting process is carried out by using such a tool, it is hard for ridges is and valleys (feed marks) to occur on the surface to be finished. This enables the roughness of the surface to be finished to be lowered, and the dimensional accuracy to be improved.

The terminal end section mentioned above is a position in which a curve having a radius of curvature of the nose portion terminates, from which position a planar flank forming a side surface of a tip is formed when a flat drag is not provided.

Preferably, the flat drag angle θ made by the tangent with the flat drag is set in the range $0 < \theta < 5°$.

According to this preferred feature, the range of the flat drag angle θ is defined as shown in FIG. 1. The reason why the flat drag angle θ is set in excess of 0° resides in that the ridges and valleys of the surface to be finished can be removed as mentioned above as long as the flat drag angle is in this range.

In the meantime, the reason why the flat drag angle θ is set to lower than 5° resides in that, when the flat drag angle θ is not smaller than 5°, the flank is shaped so that the flank excessively enters the inner side of the cutting tool since the flank extends from the flat drag further inward. This makes it difficult to fix the cutting tool to a holder.

A more preferable range is $0 < \theta \leq 1°$.

Preferably, a width (w) of the flat drag viewed from the rake face is set to $0 < w \leq 1.5$ mm.

The width (w) of the flat drag is defined as illustrated in FIG. 1. When the width of the flat drag exceeds 1.5 mm, a cutting resistance becomes excessively large, and there is the possibility that the dimensional accuracy of a material to be cut is not obtained.

A more preferable range is $0.3 < w \leq 0.7$ mm.

Preferably, the flat drag viewed from the rake face has an outwardly projecting curved shape or a linear shape.

This invention shows an example of the shape of the flat drag, and, as long as this shape is an outwardly projecting curvilinear shape or a linear shape, i.e. not a concave shape, the ridges and valleys of the surface to be finished can be removed suitably.

Preferably, the cutting tool is formed of a ceramic material or CBN.

These are examples of preferred materials for the cutting tool.

Hard materials can be named as the ceramic materials, which include alumina, alumina-TiC and silicon nitride, and which include besides these materials hard materials, such as cermet and the like. CBN is cubic boron nitride which is an especially advantageous material for the cutting tool because it enables dry-cutting to be performed which reduces the expense, waste and environmental problems of using cutting fluid. A cutting tool made of a ceramic material is formed of a ceramic sintered body.

Preferably, the cutting tool is a negative tip cutting tool.

This preferred feature gives examples the shapes of the cutting tool. A negative tip in which a rake face and a flank form a right angle as shown in FIG. 2(a) is taken as an example. Besides the negative tip, there also exists a positive tip in which a rake face and a flank form an acute angle as shown in FIG. 2(b). It is desirable that this invention be applied to a negative tip.

According to a further aspect of the present invention, the above-described cutting tool is fixed to a holder.

This invention accordingly provides a holder-carrying tool in which the above-described cutting tool is fixed to a holder (for example, a tip seat at a front end of the holder).

Therefore, when a cutting process is carried out by using this holder-carrying tool, the ridges and valleys of a surface to be finished can be suitably removed.

Preferably, when the cutting tool is fixed to the holder having a rake angle of 0° or a negative angle, a flat drag angle θ' with respect to the surface to be finished is $0 \leq \theta' < 5°$.

This preferred aspect of the invention exemplifies an angle at which a cutting process is carried out by using the above-described cutting tool fixed to a holder. Namely, when a cutting operation is carried out by using a cutting tool having the above-mentioned flat drag angle θ and fixed to a holder, the angle θ' of the flat drag with respect to a surface to be finished of a material to be cut can be set to $0 \leq \theta' < 5°$, i.e., in a substantially parallel condition. This enables the ridges and valleys of the surface to be finished to be suitably removed.

The angle θ' is not the above-mentioned flat drag angle θ but an angle of the flat drag of the cutting tool fixed to a holder with respect to the surface to be finished.

BRIEF DESCRIPTION OF THE DRAWINGS

FIG. 2 is an explanatory drawing showing types of cutting tool, wherein

FIG. 3 is a drawing showing the cutting tool of an embodiment, wherein

FIG. 5 is a drawing showing the holder-carrying tool of the embodiment, wherein

DESCRIPTION OF THE PREFERRED EMBODIMENTS

An example (embodiment) of the cutting tool according to the present invention will now be described with reference to the drawings. However, the present invention should not be construed as being limited thereto.

Embodiment 1

In this embodiment, a cutting tool formed of a ceramic material, a hard material, for example, a cutting tool formed of a sintered body of silicon nitride is taken up as an example.

a) First, the cutting tool of this embodiment will be described.

Figure 1:
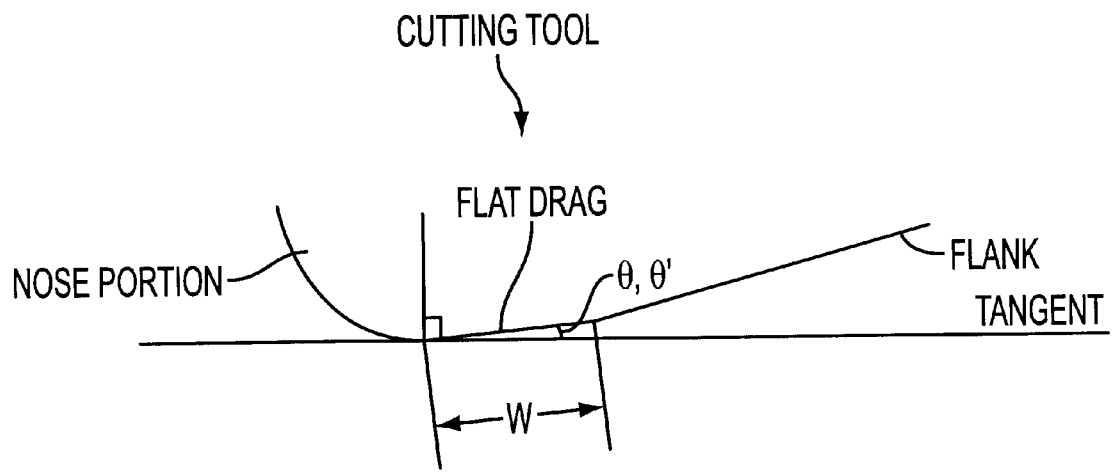
FIG. 1 is an explanatory drawing illustrating the angle and shape of a flat drag of a cutting tool.
Figure 2A:
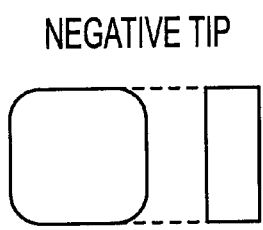
FIG. 2(a) illustrates a negative tip.
Figure 2B:
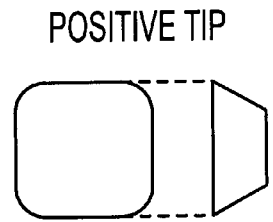
FIG. 2(b) a positive tip.
Figure 3A:
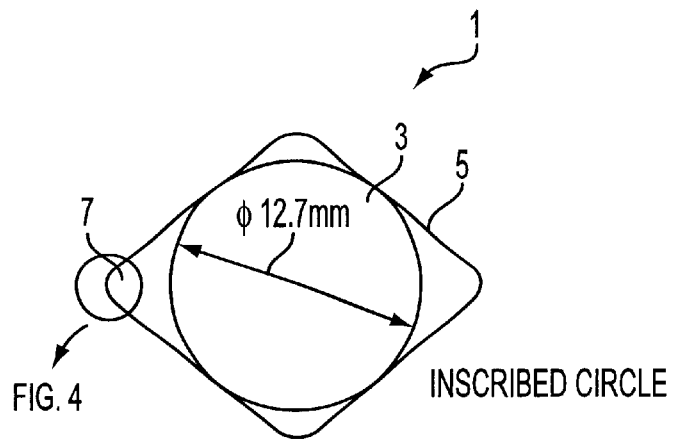
FIG. 3(a) is a plan view.
Figure 3B:
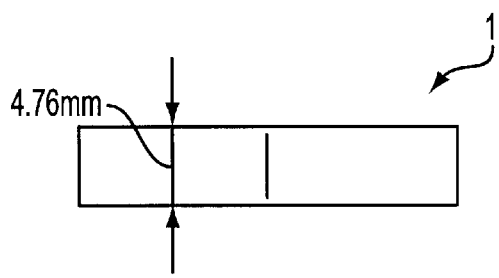
FIG. 3(b) a front view.

As shown in FIG. 3, a cutting tool 1 of this embodiment is formed of a hard material, for example, a sintered body of silicon nitride, this cutting tool being a negative tip of CNGN433 under ISO Standards. Concretely speaking, the cutting tool 1 is a rhomboidal tip having a diameter of an inscribing circle on the side of a rake face 3 of 12.7 mm and a thickness of 4.76 mm.

Figure 4:
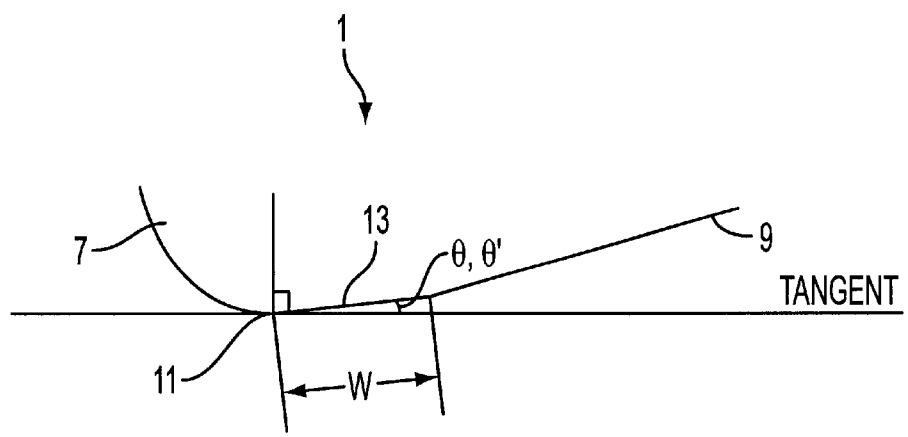
FIG. 4 is an explanatory drawing illustrating the angle and shape of the flat drag of the cutting tool of the embodiment.

This cutting tool 1 has a nose portion 7 with an acute nose angle (80°), and a curved or radiused portion of said nose portion has a radius R of 1.2 mm. A cutting edge is chamfered. As shown on an enlarged scale in FIG. 4, the cutting tool 1 is provided at a side portion (on the side of a flank 9) thereof with a flat drag 13, which is used to remove ridges and valleys of the surface to be finished, between a terminal end section 11 at which a curved surface (of radius R) of the nose portion 7 terminates and the flank 9. The flat drag 13 is provided on the left and right sides of the nose portion 7 of an acute angle.

Namely, the flat drag 13 is provided on the inner side of a tangent of the terminal end section 11 of the curved or radiused portion of the nose portion 7 in the range (for example, 1°) of flat drag angle $0 < \theta < 5°$. A width (w) (viewed from the side of the rake face 3) of the flat drag 13 is in the range of $0 < w \leq 1.5$ mm (for example, 0.5 mm).

b) The holder for the cutting tool 1 will now be described.

Figure 5A:
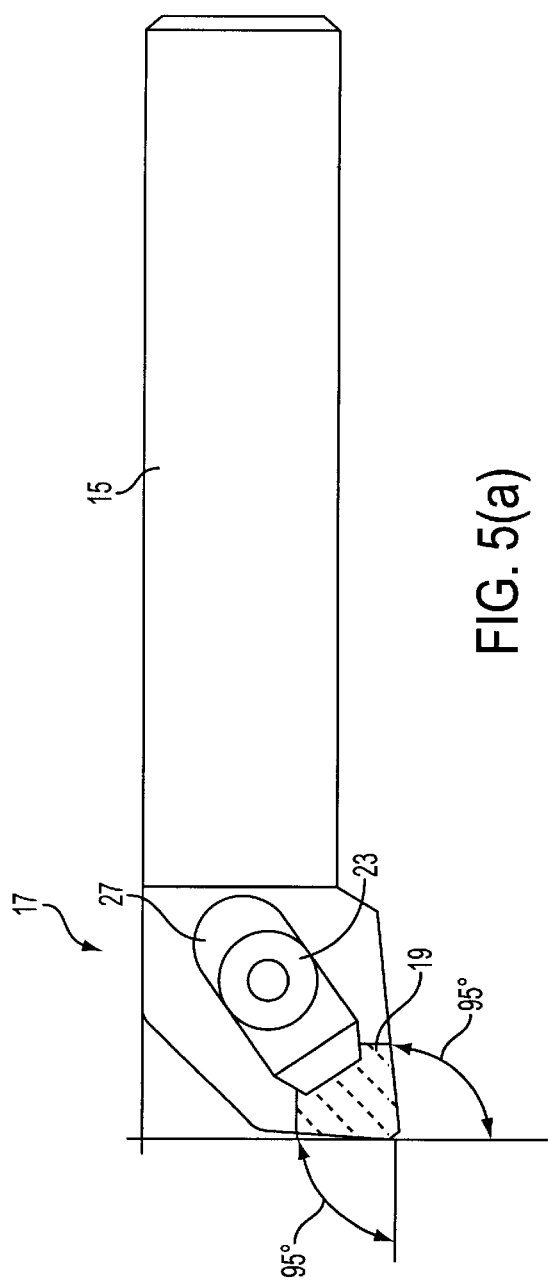
FIG. 5(a) is a plan view.

As shown in FIG. 5, a holder 15 for holding the cutting tool 1 is a columnar member formed of a steel material (for example, JIS SCM440), and provided at a front end thereof with a fixing portion 17 for fixing the cutting tool 1 thereto.

Figure 5B:
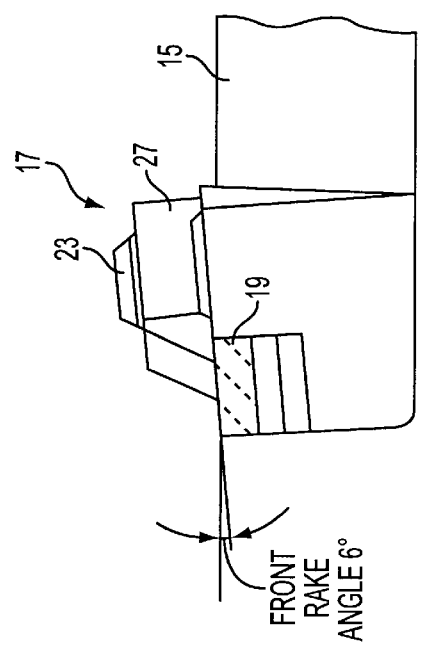
FIG. 5(b) a front view.
Figure 5C:
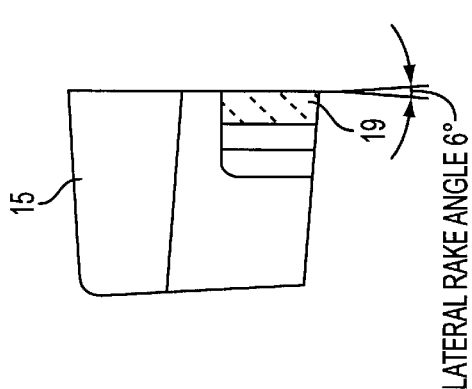
FIG. 5(c) a left side view.
Figure 6A:
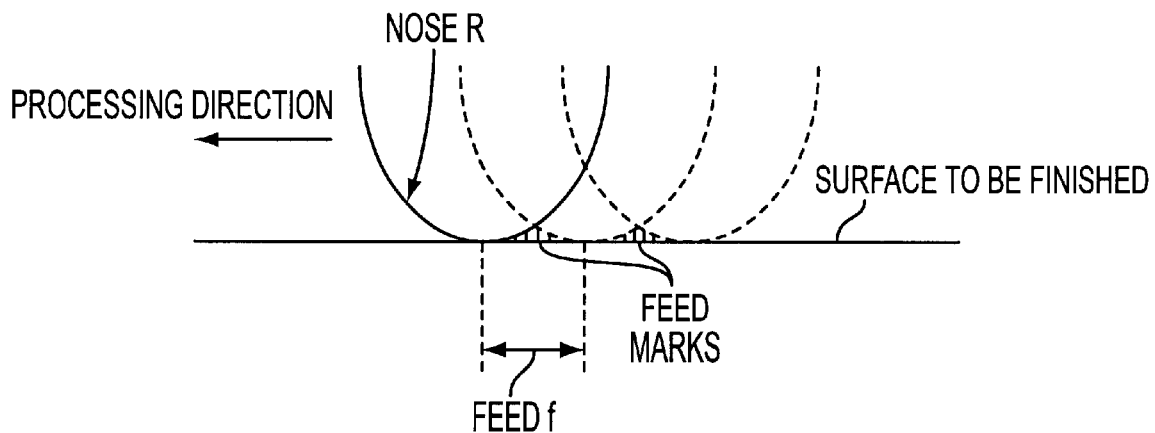
FIGS. 6(a) and 6(b) are explanatory drawings showing the related art.
Figure 6B:
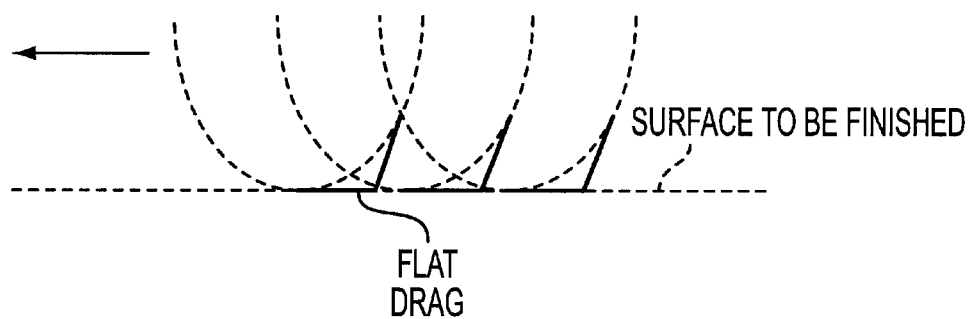
Figure 7A:
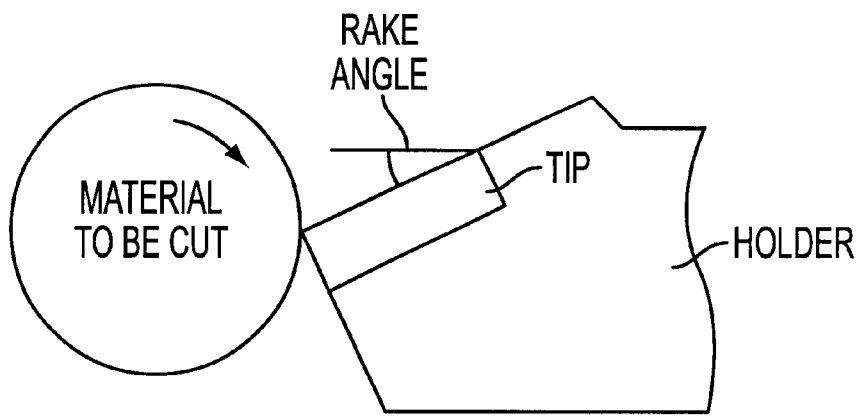
FIGS. 7(a) and 7(b) are explanatory drawings showing the related art.
Figure 7B:
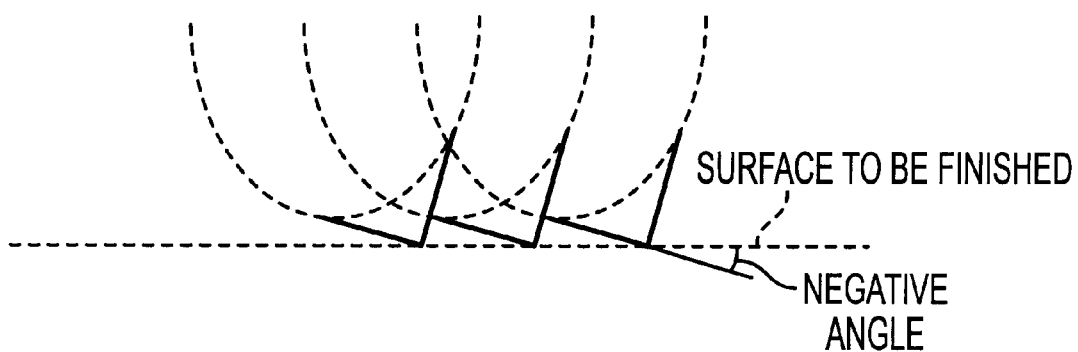

Namely, the holder 15 is provided at the front end thereof with a tip seat 19 cut out in the shape of the cutting tool 1, and the cutting tool 1 fitted in this tip seat 19 is fixed under pressure to the tip seat 19 by fixing a fixing member 27 from the upper side (refer to FIG. 5(b)) by a screw 23. In FIG. 5(c), the fixing member 27, etc. are not shown.

The surface (therefore, the cutting tool 1 as well) of the tip seat 19 is inclined slightly with respect to upper surface of the holder 15. Concretely speaking, as shown in FIG. 5(b), the seat surface is inclined by an angle equal to a front rake angle (for example, −6°) at which the rake face is inclined toward a front end of the holder 15, or, as shown in FIG. 5(c) by an angle equal to a lateral rake angle (for example −6°) at which the seat surface is inclined in the lateral direction of the holder. This enables a cutting edge 5 to be set sharp with respect to a material to be cut.

Especially, the flat drag angle θ of the cutting tool 1 of this embodiment is set in the range of $0 < \theta < 5°$. Therefore, when this cutting tool 1 is fixed to the tip seat 19 of the holder 15, the flat drag 13 comes to have an angle ($0 \leq \theta' < 5°$) with respect to, i.e., comes to be almost parallel to, the surface to be finished of the material to be cut.

Namely, when the cutting tool 1 is fixed to the holder 15 in this embodiment, the flat drag 13 is provided in advance on the cutting tool 1 so that the cutting tool 1 does not have a negative angle (flat drag angle) with respect to the surface to be finished of the material to be cut.

c) A method of manufacturing the cutting tool 1 of this embodiment will now be described.

Hard materials including 99 wt. % of silicon nitride ($Si_3N_4$) powder (oxygen content: 1.3 wt. %), a main component having an average particle diameter of not greater than 1.0 μm, and a remainder of at least one kind of powdered sintering assistant, such as one or more of MgO, $Al_2O_3$, $Y_2O_3$, $Yb_2O_3$, $Ce_2O_3$ and $ZrO_2$ having an average particle diameter of not greater than 1.0 μm, were prepared as materials of basis weight.

These materials prepared as materials of basis weight were mixed for 96 hours by using an ethanol solvent in a $Si_3N_4$ bowl, or in a pot the inner surface of which is formed of $Si_3N_4$, to obtain a slurry.

The slurry was then passed through a 325-mesh sieve, and 5.0 wt. % of an organic binder of ethanol-dissolved microwax was added to the resultant product. The resultant product was spray dried.

The granulated powder thus obtained was pressure molded so that the powder had the shape of ISO Standards: CNGN433, and the molded product was then dewaxed by heating the same in a nitrogen atmosphere set to one atmosphere, at 873 K (absolute temperature) for 60 minutes.

Primary sintering was then carried out. The primary sintering was carried out by heating the resultant powder in a nitrogen atmosphere set to 100 to 300 kPa at 1973–2173 K for 240 minutes.

Secondary sintering was then carried out by HIP (hot-isostatic-pressing) to form a sintered body of silicon nitride. This sintering was carried out by heating the primarily sintered body in a nitrogen atmosphere set to 10–100 MPa, at 1973–2023 K for 120 minutes.

The sintered body of silicon nitride was then polished by using, for example, a commercially available grinder to the shape of ISO Standards: CNGN433. During this polishing operation, the flat drag 13 was formed to the above-mentioned shape.

Thus, in this embodiment, the flat drag 13 of a proper width (w) is formed on the side of the flank 9 of the cutting tool 1 so as to extend toward the inner side of the tangent of the terminal end section 11 of the nose portion 7. Accordingly, when a cutting process is carried out with this cutting tool 1 fixed to the holder 15, the ridges and valleys of the finished surface of a material to be cut can be removed. This enables the roughness of the surface to be finished to be lowered, and the dimensional accuracy to be improved.

Since the flat drag 13 of the cutting tool 1 of this embodiment does not excessively project with respect to the finished surface of a material to be cut, the width of the flat drag can be effectively used, so that the lowering of the roughness of the surface to be finished and the improving of the dimensional accuracy can be attained. This enables the lifetime of the tool to be prolonged, and the tool to be operated for a long period of time.

d) An example of an experiment conducted for ascertaining the effects of the cutting tool according to the present invention will now be described.

In this experiment, the lifetime of the cutting tool was measured.

First, the following cutting tool according to the present invention and that of the related art were made as cutting tools used in the experiment.

Material for the tools: ISO HC4
  (Ceramic material of $Al_2O_3$-TiC)
Shape of the tools: ISO CNGN433 (with a flat drag)
Product according to the present invention:
  θ=1° (not yet fixed to a holder), w=0.5 mm
  θ=+0.40° (fixed to a holder)
Related art product:
  θ=0° (not yet fixed to a holder), w=0.5 mm
  θ=–0.6° (fixed to a holder)
Shape of the holder: ISO CCLNR2525M43-S
  (Front rake angle =–6°, Lateral rake angle =–6°)

The following cutting tests (1) and (2) were conducted under the following processing conditions.
(1) An outer surface was cut continuously, and a cutting distance at which the surface roughness was deteriorated to JIS 6,3μmRZ was measured.
(2) Separately from this test, the surface roughness at the position of a cutting distance of 2000 m was measured.
  Material of object to be cut: ISO S45CL (Induction hardened),
    Hardness Hv=500–750
  Shape of object to be cut: Outer diameter φ50.0 mm ×Length 200.0 mm
  Cutting speed: V=200 n/min
  Feed rate: f=0.10 mm/rev
  Depth of cut: d=0.15 mm
  Dry or wet: WET As a result of this cutting test (1), it was proven that one comer (nose portion) of the product according to the present invention could cut 6000 m. On the other hand, one comer of the related art product could cut only 3600 m. Namely, the product according to the present invention had a long lifetime, and could be operated for a long period of time.

As a result of the cutting test (2), it was proved that the surface roughness obtained by the product according to the present invention was as low as 2.5 μm and suitably usable. On the other hand, the surface roughness obtained by the related art product was as high as 4.7 μm, and not preferable.

The present invention is not at all limited to the above-described embodiment, and can, of course, be practiced in various modes within the scope of the claimed invention.

For example, the present invention is not limited to a rhomboidal cutting tool having a nose angle (viewed from the side of the rake face) of the above-described embodiment, and can also be applied to a rhomboidal cutting tool the nose angle of which is larger (or smaller) than the above-mentioned nose angle.

The present invention can, of course, be applied to the cutting tools of various other shapes, such as a rectangular parallelopipedal cutting tool, a cross-sectionally triangular cutting tool and the like.

As described in detail above, the cutting tool according to the present invention is provided with a flat drag on the inner side of a tangent at the terminal end section of a curved or radiused portion of the nose portion. Therefore, the ridges and valleys of a surface to be finished of a material to be cut can be removed by carrying out a cutting process by using this cutting tool fixed to a holder. This enables the surface roughness of the surface to be finished to be lowered, and the dimensional accuracy to be improved.

When the cutting tool is fixed to a holder, the flat drag does not project excessively toward the surface to be finished of a material to be cut. Therefore, the lifetime of the tool becomes long, and the tool can be operated for a long period of time.

This application is based on Japanese Patent Application No. Hei. 1187055 filed Mar. 29, 1999 which is incorporated herein by reference in its entirety.

What is claimed is:

1. A cutting tool comprising: a nose portion; a rake face; and a flank, wherein said nose portion comprises a curved portion and a flat drag, said flat drag being provided between said curved portion and said flank,
    wherein the flat drag is provided on the inner side of a tangent to a terminal end section of the curved portion, said flat drag angle θ made by the flat drag with said tangent is in the range 0°<θ<1°, and said width (w) of the flat drag viewed from the side of the rake face is in the range 0.3 mm ≦w ≦0.7 mm, and
    wherein said cutting tool is formed of a material selected from the group consisting of a ceramic material, cubic boron nitride and cermet.

2. The cutting tool according to claim 1, wherein the flat drag viewed from the side of the rake face has a linear shape.

3. The cutting tool according to claim 1, wherein said cutting tool is formed of a ceramic material or cubic boron nitride.

4. The cutting tool according to claim 1, wherein the cutting tool is a negative tip cutting tool.

5. The cutting tool according to claim 1, wherein said curved portion of said nose portion is radiused.

6. A holder-carrying tool comprising: a cutting tool according to claim 1 which is fixed to a holder.

7. The holder-carrying tool according to claim 6, adapted such that, when a rake angle of the holder to which the cutting tool is fixed is 0° or a negative angle, the angle θ' of the flat drag with respect to a surface to be finished is 0°≦θ'<5°.

* * * * *